US012673344B2

(12) United States Patent
Teng et al.

(10) Patent No.: US 12,673,344 B2
(45) Date of Patent: Jul. 7, 2026

(54) GLUE APPLYING MACHINE

(71) Applicants: KING WOOMA INDUSTRIAL CO., LTD., Taichung City (TW); Northtech Machine LLC, Borden, IN (US)

(72) Inventors: Chiao-Fu Teng, Taichung City (TW); Brandon J. Koetter, Borden, IN (US)

(73) Assignees: KING WOOMA INDUSTRIAL CO., LTD., Taichung City (TW); NORTHTECH MACHINE LLC, Borden, IN (US)

( * ) Notice: Subject to any disclaimer, the term of this patent is extended or adjusted under 35 U.S.C. 154(b) by 443 days.

(21) Appl. No.: 18/350,027

(22) Filed: Jul. 11, 2023

(65) Prior Publication Data

US 2025/0018418 A1 Jan. 16, 2025

(51) Int. Cl.
*B05C 5/02* (2006.01)
*B05C 11/10* (2006.01)

(52) U.S. Cl.
CPC ........ *B05C 5/0212* (2013.01); *B05C 11/1018* (2013.01); *B05C 11/1021* (2013.01); *B05C 11/1034* (2013.01)

(58) Field of Classification Search
None
See application file for complete search history.

(56) References Cited

U.S. PATENT DOCUMENTS

| | | | | |
|---|---|---|---|---|
| 2002/0142102 A1* | 10/2002 | Romine | B05C 5/0212 | 427/10 |
| 2003/0080159 A1* | 5/2003 | Estelle | B05C 11/1023 | 222/402.1 |
| 2014/0230727 A1* | 8/2014 | Suriawidjaja | B05C 5/0225 | 118/712 |
| 2016/0008835 A1* | 1/2016 | Giusti | B05C 5/0216 | 118/313 |

* cited by examiner

*Primary Examiner* — Binu Thomas
(74) *Attorney, Agent, or Firm* — LANWAY IPR SERVICES; Chun-Ming Shih

(57) ABSTRACT

A glue applying machine includes a machine body, a glue applying device, and a control device. The glue applying device is mounted on the working platform of the machine body. The glue applying device includes a track, a movement unit, and a height limit member. The movement unit includes a glue applying member and a glue applying detection member. The glue applying detection member emits a laser beam which defines an effective detection section and a non-effective detection section. The height limit member defines a contact face. The control device controls the laser beam to detect the operating area of the workpiece on the working platform through the effective detection section and to start the glue applying member. Thus, the glue applying detection member exactly detects the operating area on the working platform, and the glue applying member applies the glue on the correct positions.

5 Claims, 8 Drawing Sheets

GLUE APPLYING MACHINE

BACKGROUND OF THE INVENTION

Field of the Invention

The current invention relates to a processing machine and, more particularly, to a glue applying machine.

Description of the Related Art

In the conventional furniture and cabinetry processing procedures, multiple wooden parts are connected by locking of mortise and tenons, PG9, and other joinery methods. Then, the mortise and tenons are adhered by glue or adhesive. Thus, the boards are assembled to form a structure of the furniture, such as a frame, box and the like. A glue applying machine is used to apply glue on the mortise and tenons. However, the conventional glue applying machine has the following disadvantages. The operator either has to use premade moulds specific to part size or pattern, or has to measure the width of the boards, the distance between each of the mortise and tenon, the depth of each of the mortises, etc., before the applying process. Then, the data is sent to the processor of the glue applying machine. Then, the glue applying machine performs the glue applying process. However, it is necessary to measure the data and send the information to the processor when the boards have different specifications or when the mortise and tenons have different sizes or joinery patterns, thereby increasing the whole working time. In addition, when the measurement causes errors or the input data is wrong, the accuracy of the applied glue location is not correct, so the process has to be repeated, thereby decreasing the working efficiency.

BRIEF SUMMARY OF THE INVENTION

In accordance with the current invention, there is a provided glue applying machine comprising of a machine body, a glue applying device, and a control device. The machine body includes a working platform for placing a workpiece within operating area. The glue applying device is mounted on the machine body and situated at the working platform. The glue applying device includes a track mounted on the machine body, a movement unit mounted on the track and moves transversely, and a height limit member mounted on the movement unit. The movement unit includes a glue applying member directed toward the working platform, and a glue applying detection member located at a side of the glue applying member and is directed toward the working platform. The glue applying detection member emits a laser beam which defines an effective detection section and a non-effective detection section. The height limit member defines a contact face contacting the workpiece. The control device sets at least one glue applying mode. The control device controls the laser beam to judge and detect the operating area of the workpiece through the effective detection section and to start the glue applying member.

Preferably, the movement unit further includes an object detection member mounted on a side of the glue applying detection member. When the movement unit is moved transversely, the object detection member emits a light beam to detect an object and to control a movement direction of the movement unit.

Preferably, the machine body includes an abutting member mounted on the working platform. The abutting member limits the position of the workpiece placed on the working platform so that the operating area of the workpiece is located under and aligns with the glue applying member.

Preferably, the operating area includes multiple mortise and multiple tenons. The mortise and tenons are arranged alternately. Each of the mortises has a bottom defining a glue applying face.

Preferably, a distance of the effective detection section is set according to a distance of a height of the height limit member to the contact face.

According to an advantage of the current invention, the glue applying detection member exactly detects the operating area of the workpiece on the working platform, and the glue applying member directly applies the glue on the correct locations, so that the glue applying machine precisely judges the positions to be glued and applies the glue quickly.

According to another advantage of the current invention, when the operating area of the workpiece has different sizes or patterns, the glue applying detection member detects the positions to be glued and applies the glue, without having to measure and set the additional sizes or patterns.

According to a further advantage of the current invention, the height limit member assures the positions quickly, and the effective detection section of the laser beam of the glue applying detection member cooperates with the height limit member, without having to consider the thickness and size of the workpiece, so that the glue applying machine rapidly judges and applies the glue on the operating area of the workpiece.

According to a further advantage of the current invention, the laser beam of the object detection member judges the workpiece in advance. When the laser beam of the object detection member does not detect existence of the object, that is, the workpiece has passed the object detection member 224 completely, the glue applying member stops applying the glue.

Further benefits and advantages of the current invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
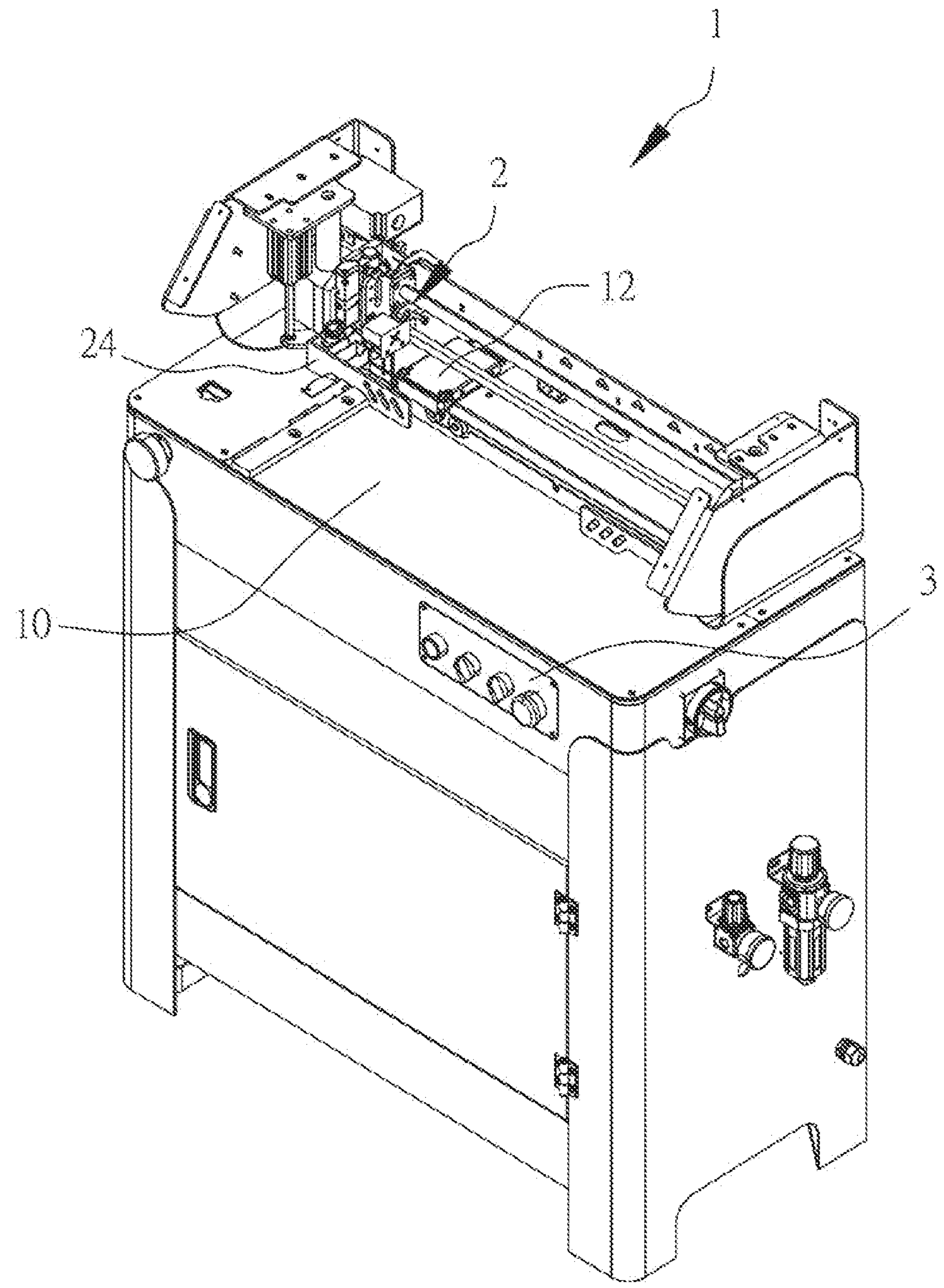
FIG. 1 is a perspective view of a glue applying machine in accordance with the preferred embodiment of the current invention.

Referring to the drawings and initially to FIGS. 1-5, a glue applying machine in accordance with the preferred embodimentment of the present invention comprises a machine body (or bed or base) 1, a glue applying device 2, and a control device 3. The machine body 1 defines a working platform (or table) 10 for placing a workpiece 4 with an operating area (or zone) 40. The glue applying device 2 is mounted on the machine body 1 and situated at the working platform 10. The glue applying device 2 includes a track 20, a movement unit 22, and a height limit member 24. The track 20 is mounted on the machine body 1. The movement unit 22 is mounted on the track 20 and moved transversely. The height limit member 24 is mounted on the movement unit 22. The movement unit 22 includes a glue applying member 220, a glue applying detection member 222, and an object detection member 224. The glue applying member 220 is directed toward the working platform 10. The glue applying detection member 222 is located at a side of the glue applying member 220 and directed toward the working platform 10. The object detection member 224 is mounted on a side of the glue applying detection member 222.

Figure 5:
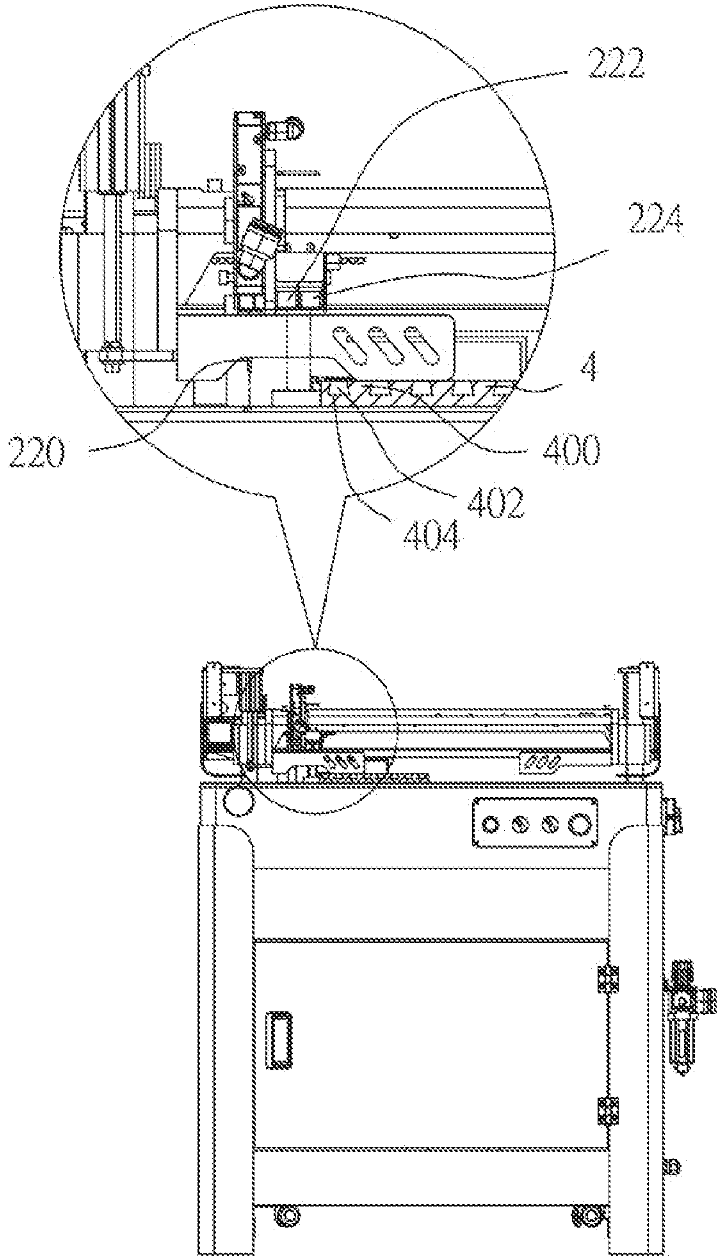
FIG. 5 is an operational view of the glue applying machine as shown in FIG. 2.

When the movement unit 22 is moved transversely, the object detection member 224 emits a light beam to detect an object and to control a movement direction of the movement unit 22. The object includes the operating area 40 of the workpiece 4. The operating area 40 includes multiple tongues (or tenons) 400 and multiple grooves (or mortises) 402 as shown in FIG. 5. The tongues 400 and the grooves 402 are arranged alternately. Each of the grooves 402 has a bottom defining a glue applying face 404 as shown in FIG. 5.

Figure 3:
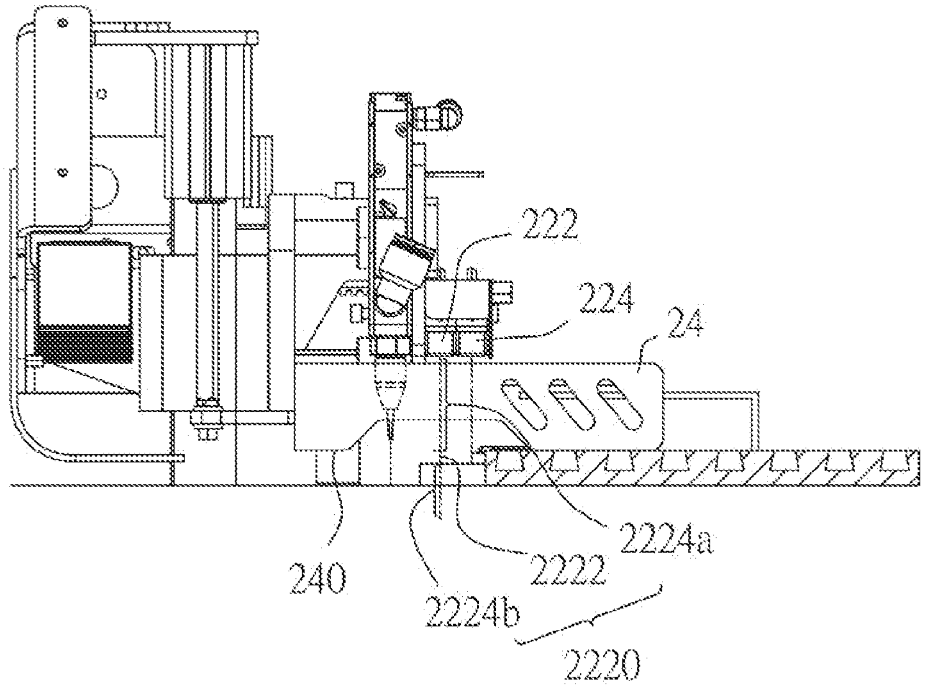
FIG. 3 is an operational view of the glue applying machine as shown in FIG. 2.

The glue applying detection member 222 emits a laser beam 2220 which is divided into an effective (or useful) detection section 2222, a first non-effective (or useless) detection section 2224*a*, and a second non-effective (or useless) detection section 2224*b* as shown in FIG. 3. The height limit member 24 defines a contact face 240 contacting the workpiece 4 to keep stability of detection of the glue applying detection member 222.

The control device 3 sets at least one glue applying mode. The control device 3 controls the laser beam 2220 to judge and detect the operating area 40 of the workpiece 4 through the effective detection section 2222 and to start the glue applying member 220.

The machine body 1 includes an abutting member 12 mounted on the working platform 10. The abutting member 12 limits the position of the workpiece 4 placed on the working platform 10 so that the operating area 40 of the workpiece 4 is located under and aligns with the glue applying member 220.

The starting point of the first non-effective detection section 2224*a* is the bottom of the glue applying detection member 222, and the end point of the first non-effective detection section 2224*a* is set to be 1 mm above the contact face 240 of the height limit member 24. The starting point of the effective detection section 2222 is set to be 1 mm above the bottom of the height limit member 24, and the end point of the effective detection section 2222 is set to be 4 mm under the contact face 240 of the height limit member 24. The depth of each of the grooves 402 is not less than 4 mm so that the effective detection section 2222 will not sense the glue applying face 404 of each of the grooves 402. Thus, the second non-effective detection section 2224*b* is an area under the effective detection section 2222.

The laser beam functions as a detection medium of the glue applying detection member 222 and the object detection member 224. The laser beam 2220 produced by the glue applying detection member 222 is divided into the effective detection section 2222, the first non-effective detection section 2224*a*, and the second non-effective detection section 2224*b*. The effective detection section 2222 is used to detect the operating area 40 of the workpiece 4. The effective detection section 2222 sets the height of the contact face 240 of the height limit member 24. The setting is processed in the object detection member 224 according to the requirement of the machine body 1. After the height of the first non-effective detection section 2224*a* is set, the effective detection section 2222 is used to detect and judge the position of the workpiece 4. At the same time, the glue applying mode of the control device 3 is used to judge the position of the mortise 400 or the tenons 402 and to apply the glue accurately. Thus, when the effective detection section 2222 of the laser beam 2220 of the glue applying detection member 222 detects existence of the object (or the operating area 40 of the workpiece 4), a signal is delivered to the glue applying member 220 to apply the glue. On the contrary, even when the first non-effective detection section 2224*a* or the second non-effective detection section 2224*b* detects existence of the object, no signal will be delivered to the glue applying member 220.

On the other hand, when the laser beam of the object detection member 224 is projected on the object, a signal is delivered to the movement unit 22, so that the movement unit 22 is moved successively, the glue applying detection member 222 continues to detect the object, and the glue applying member 220 continues to apply the glue. When the laser beam of the object detection member 224 does not detect existence of the object, that is, the workpiece 4 has passed the object detection member 224 completely, the glue applying member 220 stops applying the glue, and the movement unit 22 is moved back on the track 20 and returned to the original position.

Figure 2:
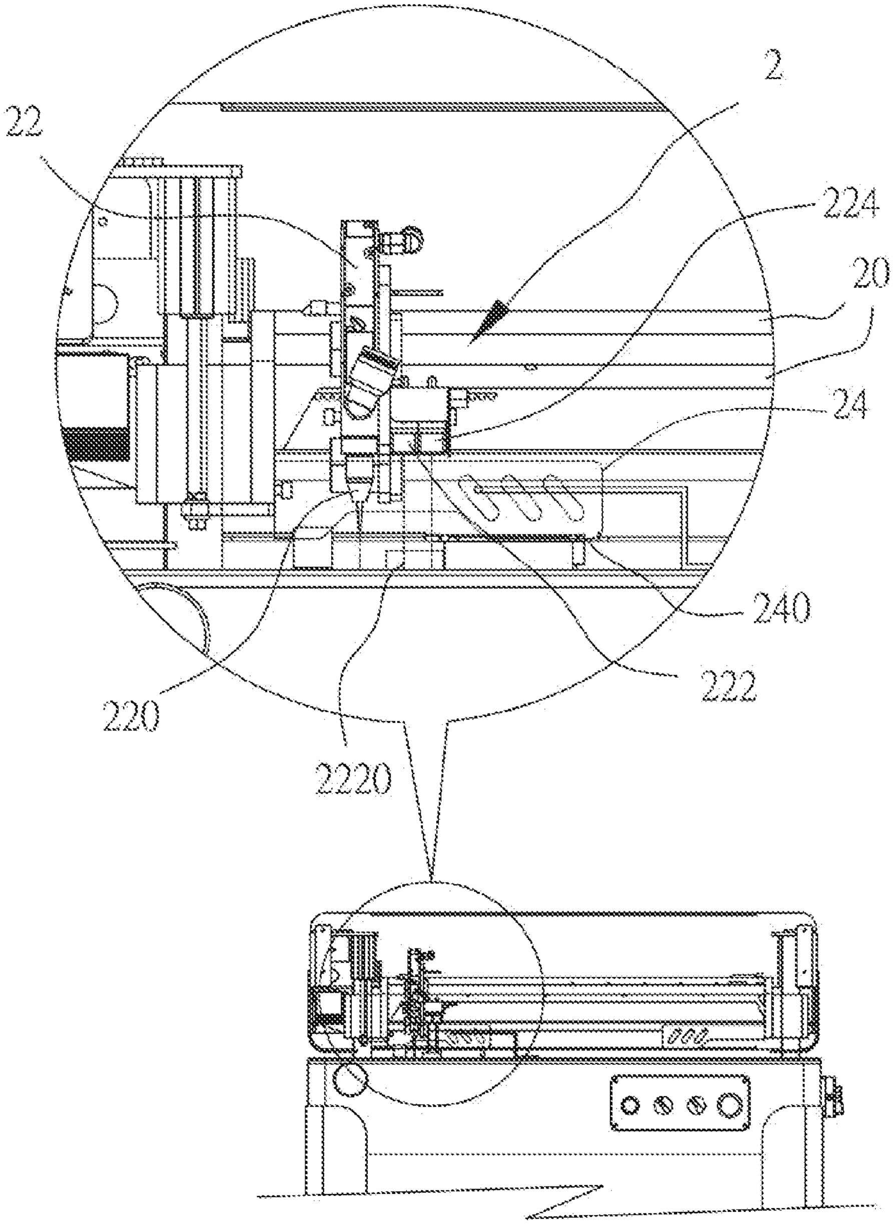
FIG. 2 is a locally enlarged planar view of the glue applying machine in accordance with the preferred embodiment of the current invention.
Figure 4:
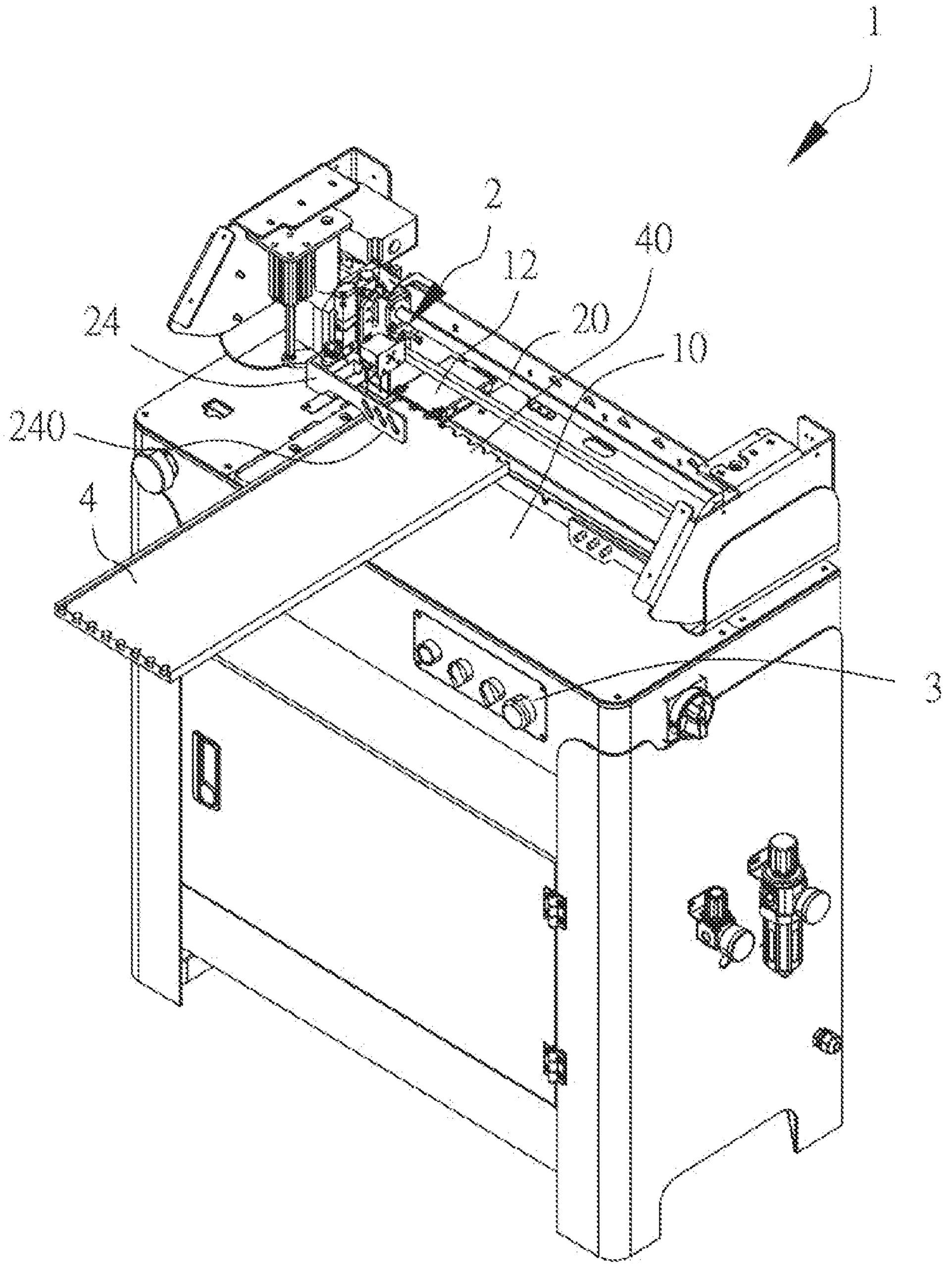
FIG. 4 is an operational view of the glue applying machine as shown in FIG. 1.

Referring to FIGS. 3-5 with reference to FIGS. 1 and 2, the glue applying mode of the control device 3 includes a tenon applying glue mode for applying glue on the tenons 400 and a mortise applying glue mode for applying glue on the mortises 402. In practice, the control device 3 controls the effective detection section 2222 of the laser beam 2220 of the glue applying detection member 222 to detect the operating area 40 of the workpiece 4, and to start the glue applying member 220.

Figure 6:
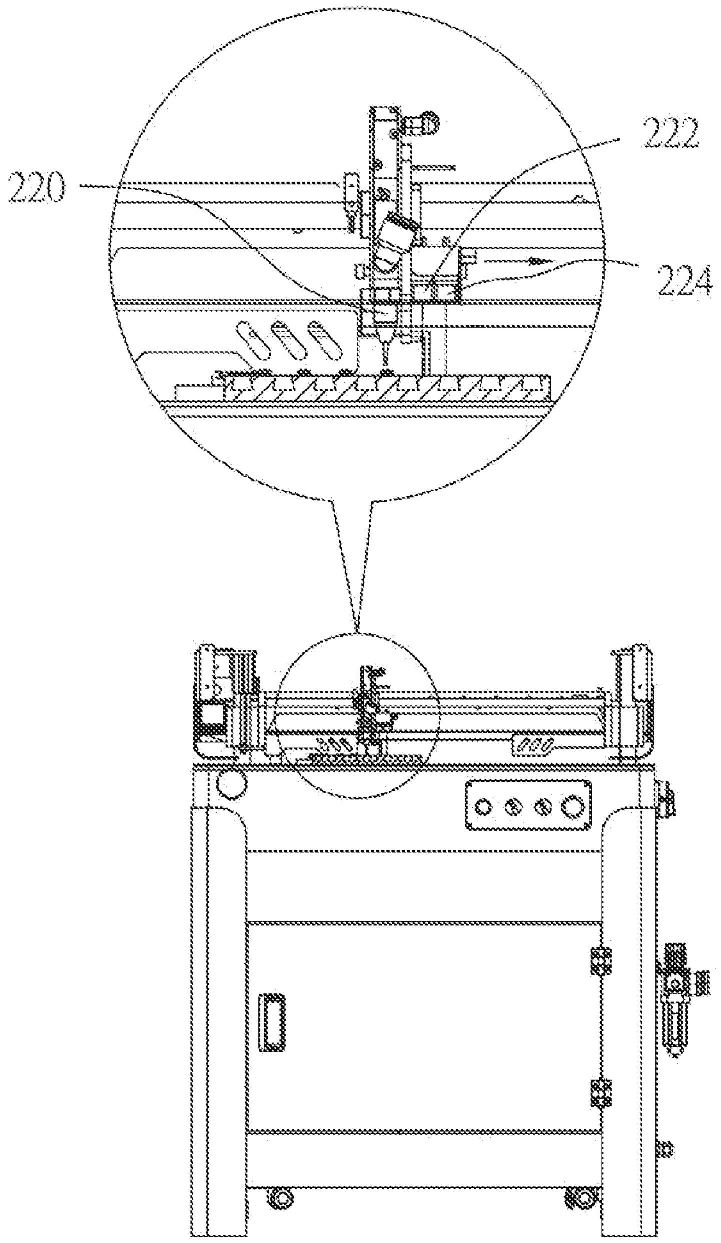
FIG. 6 is an operational view showing a tenon applying glue mode.
Figure 7:
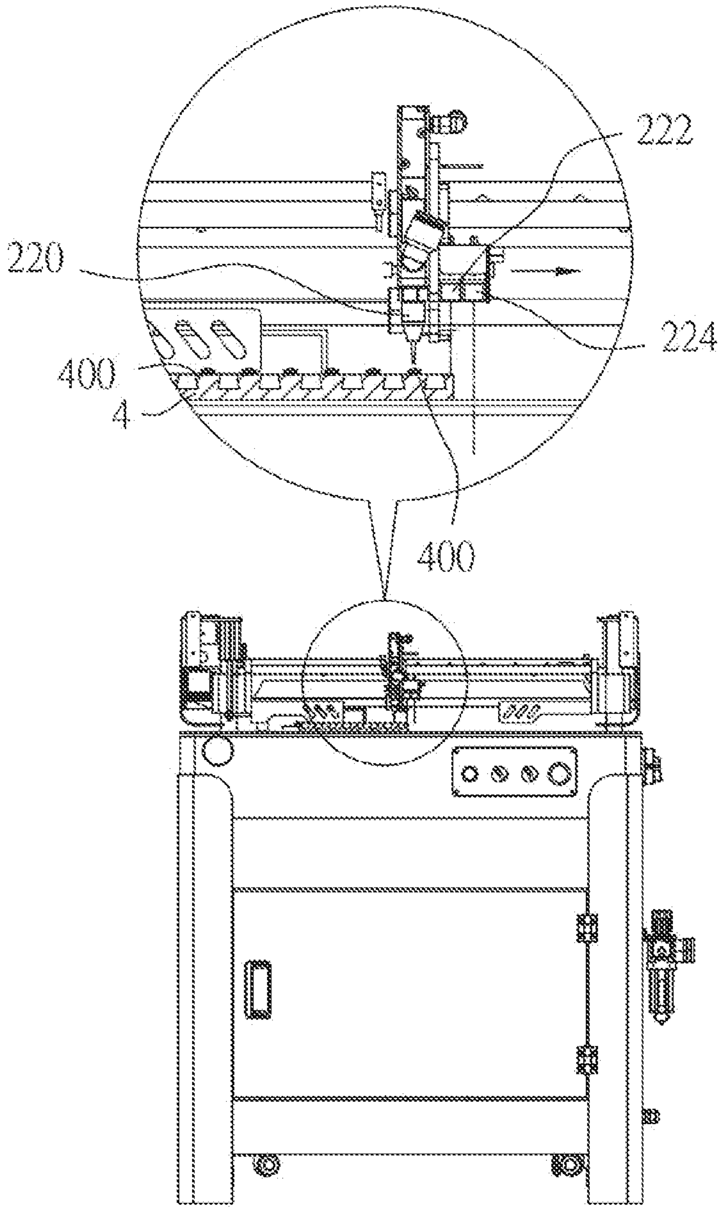
FIG. 7 is an operational view showing finish of the tenon applying glue mode as shown in FIG. 6.

Referring to FIGS. 6 and 7 with reference to FIGS. 1-5, the tenon applying glue mode is performed. First, the workpiece 4 is placed on the working platform 10. The abutting member 12 of the machine body 1 limits the depth of the workpiece 4 extending into the working platform 10 so that the operating area 40 of the workpiece 4 is located under and aligns with the glue applying member 220. Then, the glue applying device 2 is moved downward until the contact face 240 of the height limit member 24 touches the workpiece 4. The effective detection section 2222 of the laser beam 2220 of the glue applying detection member 222 exactly detects the operating area 40 of the workpiece 4 by height restriction of the height limit member 24. When the control device 3 selects the tenon applying glue mode, the effective detection section 2222 detects the position of each of the tenons 400 on the operating area 40, and the glue applying member 220 applies the glue on each of the tenons 400. In such a manner, the glue applying member 220 applies the glue quickly and exactly by the effective detection section 2222 of the laser beam 2220 of the glue applying detection member 222 even when the distance between the tenons 400 is different or when the tenons 400 have different width. Thus, when the tenons 400 on the operating area 40 of the workpiece 4 are different, the workpiece 4 is placed on the working platform 10, the glue applying device 2 is moved downward, the movement unit 22 is moved, and the glue applying detection member 222 cooperates with the object detection member 224 to apply the glue quickly.

Figure 8:
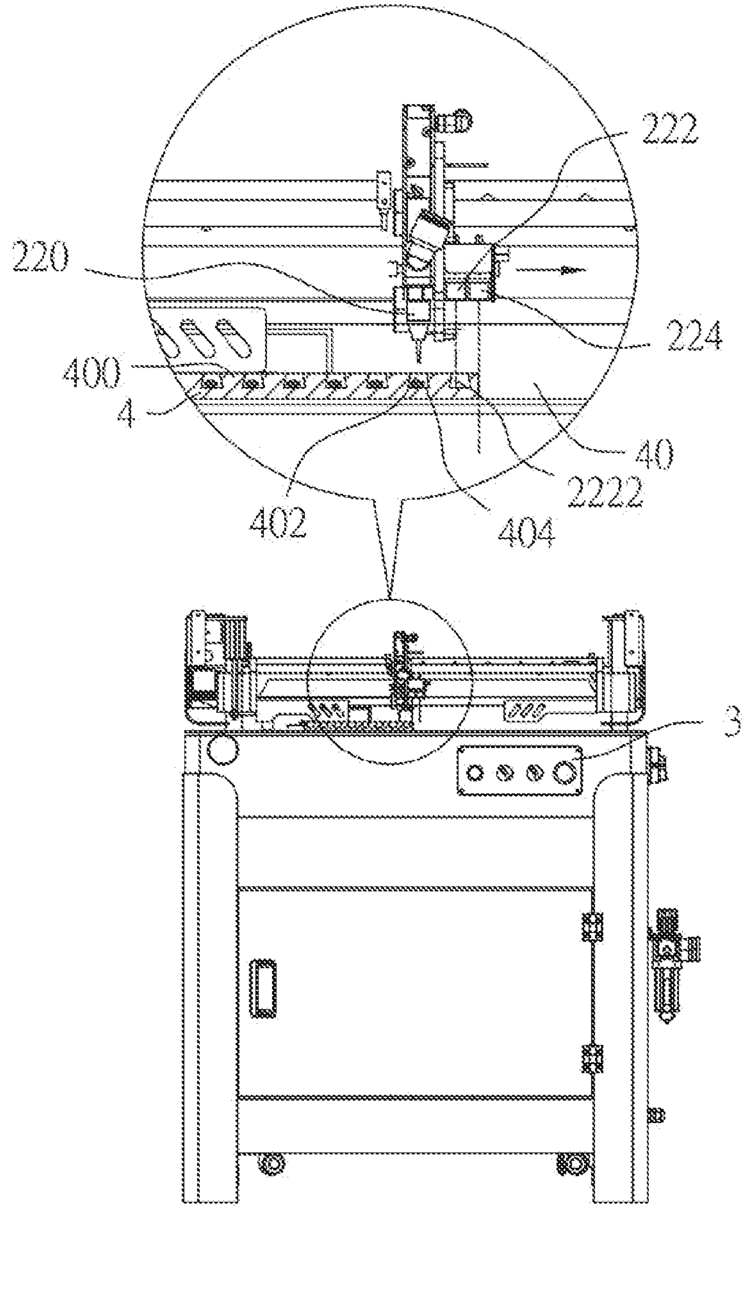
FIG. 8 is an operational view showing a mortise applying glue mode.

Referring to FIG. 8 with reference to FIGS. 1-5, the groove applying glue mode of the control device 3 is performed. The glue is applied on a position of the glue applying face 404 of each of the tenons 402 on the operating area 40. The control device 3 controls the effective detection section 2222 of the laser beam 2220 of the glue applying detection member 222 to detect the operating area 40 of the workpiece 4, and to start the glue applying member 220. In practice, the glue applying member 220 applies the glue on a region outside of the area detected by the effective detection section 2222. In other words, when the effective detection section 2222 detects each of the tenons 400, the glue applying member 220 applies the glue on a region without the tongues 400, so that the glue is exactly applied to the glue applying face 404 of each of the mortises 402 on the operating area 40.

In conclusion, the glue applying detection member 222 exactly detects the operating area 40 of the workpiece 4 on the working platform 10, and the glue applying member 220 directly applies the glue on the correct positions, so that the glue applying machine precisely judges the positions to be glued and applies the glue quickly. In addition, when the operating area 40 of the workpiece 4 has different sizes, the glue applying detection member 222 detects the positions to be glued and applies the glue, without having to measure and set the sizes additionally. Further, the height limit member 24 assures the positions quickly, and the effective detection section 2222 of the laser beam 2220 of the glue applying detection member 222 cooperates with the height limit member 24, without having to consider the thickness and size of the workpiece 4, so that the glue applying machine rapidly judges and applies the glue on the operating area 40 of the workpiece 4. Further, the laser beam of the object detection member 224 judges the workpiece 4 in advance. When the laser beam of the object detection member 224 does not detect existence of the object, that is, the workpiece 4 has passed the object detection member 224 completely, the glue applying member 220 stops applying the glue.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A glue applying machine comprising:

a machine body, a glue applying device, and a control device;

wherein:

the machine body defines a working platform for placing a workpiece with an operating area;

the glue applying device is mounted on the machine body and situated at the working platform;

the glue applying device includes a track mounted on the machine body, a movement unit mounted on the track and moved transversely, and a height limit member mounted on the movement unit;

the movement unit includes a glue applying member directed toward the working platform, and a glue applying detection member located at a side of the glue applying member and directed toward the working platform;

the glue applying detection member emits a laser beam which defines an effective detection section and a non-effective detection section;

the height limit member defines a contact face contacting the workpiece;

the control device sets at least one glue applying mode;

the control device controls the laser beam to judge and detect the operating area of the workpiece through the effective detection section and to start the glue applying member.

2. The glue applying machine as claimed in claim 1, wherein the movement unit further includes an object detection member mounted on a side of the glue applying detection member, and when the movement unit is moved transversely, the object detection member emits a light beam to detect the workpiece and to control a movement direction of the movement unit.

3. The glue applying machine as claimed in claim 1, wherein the machine body includes an abutting member mounted on the working platform, and the abutting member limits the position of the workpiece placed on the working platform so that the operating area of the workpiece is located under and aligns with the glue applying member.

4. The glue applying machine as claimed in claim 1, wherein the operating area includes multiple tenons and multiple mortises, the tenons and the mortises are arranged alternately, and each of the mortises has a bottom defining a glue applying face.

5. The glue applying machine as claimed in claim 1, wherein a distance of the effective detection section is set according to a distance of a height of the height limit member to the contact face.

* * * * *